United States Patent
Haar et al.

(10) Patent No.: US 10,969,579 B2
(45) Date of Patent: Apr. 6, 2021

(54) AUGMENTED REALITY GLASSES, METHOD FOR DETERMINING A POSE OF AUGMENTED REALITY GLASSES, AND TRANSPORTATION VEHICLE SUITABLE FOR USING THE AUGMENTED REALITY GLASSES OR THE METHOD

(71) Applicant: VOLKSWAGEN AKTIENGESELLSCHAFT, Wolfsburg (DE)

(72) Inventors: Adrian Haar, Hannover (DE); Johannes Tümler, Wellen (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/641,710

(22) PCT Filed: Aug. 15, 2018

(86) PCT No.: PCT/EP2018/072156
§ 371 (c)(1),
(2) Date: Feb. 25, 2020

(87) PCT Pub. No.: WO2019/042778
PCT Pub. Date: Mar. 7, 2019

(65) Prior Publication Data
US 2020/0218065 A1    Jul. 9, 2020

(30) Foreign Application Priority Data
Aug. 30, 2017   (DE) .................... 10 2017 215 163.3

(51) Int. Cl.
*G09G 5/00*    (2006.01)
*G02B 27/00*   (2006.01)
(Continued)

(52) U.S. Cl.
CPC ....... *G02B 27/0093* (2013.01); *G02B 27/017* (2013.01); *G06F 3/012* (2013.01); *G02B 2027/0178* (2013.01)

(58) Field of Classification Search
CPC . G09G 3/36; G09G 5/00; G11C 19/00; G02F 1/1345; G06F 3/038
See application file for complete search history.

(56) References Cited

U.S. PATENT DOCUMENTS 10,162,409 B2   12/2018   Knebel et al.
10,262,433 B2    4/2019   Spiessl et al.
(Continued)

FOREIGN PATENT DOCUMENTS

DE          1938480 U      5/1966
DE     102005058240 A1     6/2007
(Continued)

OTHER PUBLICATIONS

Search Report for International Patent Application No. PCT/EP2018/072156; dated Oct. 29, 2018.

*Primary Examiner* — Pegeman Karimi
(74) *Attorney, Agent, or Firm* — Barnes & Thornburg, LLP

(57) ABSTRACT

Augmented reality glasses, a method for determining a pose of augmented reality glasses and a transportation vehicle for using the augmented reality glasses or the method. The augmented reality glasses have an optical capture apparatus for capturing environment data relating to an environment of the augmented reality glasses and an interface to a pose determination apparatus for determining a pose of the augmented reality glasses based on the environment data. The optical capture apparatus captures only light of a defined polarization.

17 Claims, 4 Drawing Sheets

(51) Int. Cl.
*G02B 27/01* (2006.01)
*G06F 3/01* (2006.01)

(56) References Cited

U.S. PATENT DOCUMENTS

| | | | | |
|---|---|---|---|---|
| 10,625,580 | B1* | 4/2020 | Jones | B60J 3/04 |
| 2007/0273610 | A1* | 11/2007 | Baillot | G08G 5/0069 |
| | | | | 345/8 |
| 2017/0285349 | A1* | 10/2017 | Ayres | G02B 27/0172 |
| 2019/0018255 | A1* | 1/2019 | Qin | G02B 30/25 |
| 2019/0265477 | A1* | 8/2019 | Perreault | H04N 13/334 |

FOREIGN PATENT DOCUMENTS

| | | |
|---|---|---|
| DE | 102006006001 B3 | 10/2007 |
| DE | 102006013700 B3 | 10/2007 |
| DE | 102014217963 A1 | 3/2016 |
| DE | 102014225222 A1 | 6/2016 |
| JP | H09219810 A | 8/1997 |
| WO | 2016001079 A1 | 1/2016 |
| WO | 2016037819 A1 | 3/2016 |

\* cited by examiner

AUGMENTED REALITY GLASSES, METHOD FOR DETERMINING A POSE OF AUGMENTED REALITY GLASSES, AND TRANSPORTATION VEHICLE SUITABLE FOR USING THE AUGMENTED REALITY GLASSES OR THE METHOD

PRIORITY CLAIM

This patent application is a U.S. National Phase of International Patent Application No. PCT/EP2018/072156, filed 15 Aug. 2018, which claims priority to German Patent Application No. 10 2017 215 163.3, filed 30 Aug. 2017, the disclosures of which are incorporated herein by reference in their entireties.

SUMMARY

Illustrative embodiments relate to augmented reality glasses and to a method for determining a pose of augmented reality glasses. Illustrative embodiments furthermore relate to a transportation vehicle which is suitable for use of the disclosed augmented reality glasses or of a disclosed method.

BRIEF DESCRIPTION OF THE DRAWINGS

Disclosed embodiments will be described in more detail with respect to the figures, in which.

DETAILED DESCRIPTION

Figure 1:
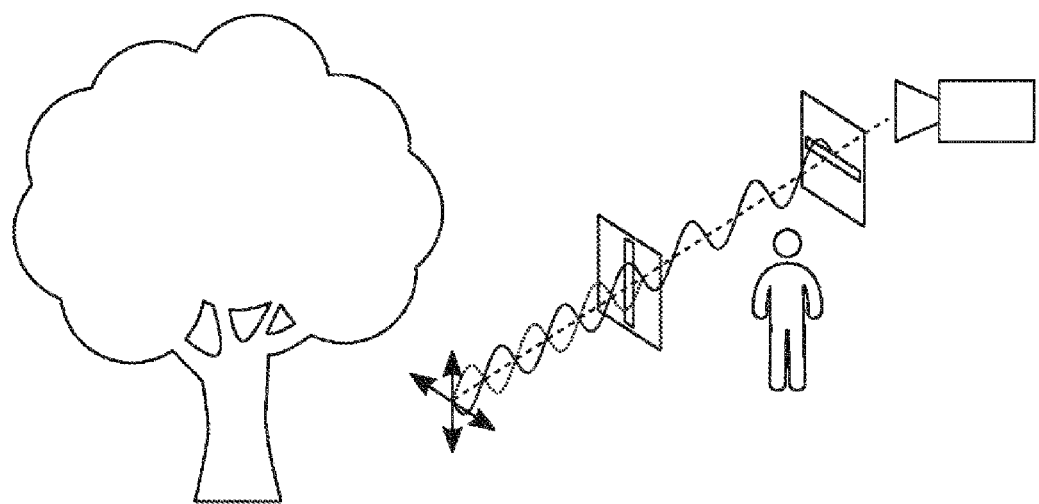
FIG. 1 schematically shows the concept of the disclosed solution for determining a pose of augmented reality glasses.

With the continuous further development of virtual and augmented reality technologies and applications, these are also becoming used in transportation vehicles. Augmented reality (AR) is an enhancement of the real world by virtual elements which are registered positionally correctly in three-dimensional space and allow real-time interaction.

At least one disclosed embodiment for enhancing the driver's workstation correspondingly with perspectively correct virtual enhancements is offered by augmented reality glasses. Augmented reality glasses are worn like normal glasses, but comprise one or more projection units or displays, with the aid of which information can be projected to the wearer of the glasses in front of their eyes or directly onto the retina. The glasses are in this case configured in such a way that the wearer can also see the environment.

Optionally, information or instructions are displayed to the wearer in a contact-analog state. In this case, the displaying of the information or instructions takes place at a position which is based on the position of an object in the environment, for example, adjacent to the object or superimposed with it. By this optical superposition of the display and the driving scene, fewer head and eye movements are required to read the information. Furthermore, the adaptation workload for the eyes is reduced, since it is necessary to accommodate less or not at all depending on the virtual distance of the display. By marking objects and overlaying information at its real reference position, i.e., by contact-analog representation, environment-related information can be represented directly in the field of view of the driver. Since the displays can be represented as "part of the environment", extremely rapid and intuitive interpretations by the wearer are possible. This direct graphical enhancement of the environment as augmented reality can therefore significantly reduce the cognitive transfer requirements.

Registration of the virtual information in the real field of view of the driver in the sense of augmented reality bases very great demands on technical implementation. To be able to represent virtual contents positionally accurately and perspectively correctly in reality, very detailed knowledge about the environment and the transportation vehicle's own movement is necessary. The pose of the augmented reality glasses, i.e., their position and orientation relative to the transportation vehicle, must also be known.

For the pose determination of augmented reality glasses, it is possible to use inertial measurement systems which are based on mass inertia. The sensors of such measurement systems are fastened directly on the glasses and measure the movements of glasses by recording accelerations. One drawback of inertial systems is that only relative measurements are carried out and double integration of the measurement result leads to a drift, which in a short time makes the tracking result unusable. Inertial systems would therefore necessarily have to be coupled with a non-drifting measurement system.

In general, optical measurement systems are therefore used for the pose determination of augmented reality glasses. In this case, observation of the objects to be followed usually takes place from the outside, for which reason the term outside-in tracking is used for such systems. To this end, for example, an additional sensor system is available in the transportation vehicle, for example, a camera, which records movements of the augmented reality glasses.

For example, the work by Guy Berg: "Das Vehicle in the Loop—Ein Werkzeug für die Entwicklung and Evaluation von sicherheitskritischen Fahrerassistenzsystemen" [The vehicle in the loop—a tool for the development and evaluation of safety-critical driver assistance systems] [1] describes a test and simulation environment for driver assistance systems. In this case, a test and simulation environment together with integrated traffic simulation is linked with a real test transportation vehicle. The driver is in this case based in an augmented or virtual reality with the aid of a head-mounted display (HMD), so that he receives direct visual feedback from the simulation environment as well as haptic, vestibular, somatosensory and acoustic feedback from the real transportation vehicle interaction. During operation, the position and attitude of the transportation vehicle on a test track is located. By knowledge of this in the real world, the corresponding position and attitude of the transportation vehicle in the virtual world are also known. In addition, the gaze direction of the driver is determined with the aid of a sensor installed in the transportation vehicle. With the aid of the position and attitude of the transportation vehicle, and the gaze direction of the driver, the image of the virtual world corresponding to reality is generated in the simulation software and visualized the driver by the HMD. In this case, optical tracking of the head is used, which employs optical markers.

One drawback of outside-in systems is that a second measurement system is required in addition to the glasses.

As an alternative to outside-in tracking, so-called inside-out tracking may be used, in which the measurement system is integrated into the object to be followed, i.e., the environment is acquired from the viewpoint of the object. In this case, the measuring system itself is moved.

For example, DE 10 2014 217 963 A1 describes data glasses for use in a transportation vehicle. The data glasses comprise a display, and infrared camera, in the pictures of which essentially infrared light is imaged, and electronic processing method or mechanism. With the aid of the camera, the environment of the data glasses is recorded. A predefined pattern is then identified in the pictures. To this end, an infrared pattern is applied beforehand in the transportation vehicle interior with the aid of a coating. As a function of the identified pattern, the pose of the data glasses is finally determined.

One drawback of the described system is that special markers need to be applied in the transportation vehicle which may be undesirable in terms of the configuration and impression of the interior.

Modern augmented reality glasses use visual systems and machine learning to determine a maximally accurate position of the glasses in space. In this case, the pose and movement of the glasses are determined as a function of significant corners and edges in the surrounding space by methods of optical measurement technology. For application in a transportation vehicle, however, this methodology may be error-prone since the optical measurement systems also include optical signals of the transportation vehicle exterior, i.e., of the street or objects on or at the roadway in the calculation. Since the transportation vehicle is moving but the interior is static, the measuring system receives false information. The pose determination may therefore fail.

Disclosed embodiments provide alternative solutions for determining a pose of augmented reality glasses.

This achieved by augmented reality glasses, by a method, by a transportation vehicle and by a system.

According to a first disclosed embodiment, augmented reality glasses comprise:
  an optical acquisition device for acquiring environmental data of an environment of the augmented reality glasses, the optical acquisition device being adapted to acquire only light of a defined polarization; and
  an interface to a pose determination device for determining a pose of the augmented reality glasses with the aid of the environmental data.

According to another disclosed embodiment, a method for determining a pose of augmented reality glasses comprises:
  acquiring environmental data of an environment of the augmented reality glasses with an optical acquisition device, only light of a particular polarization being acquired by the optical acquisition device during the acquisition of the environmental data; and
  determining a pose of the augmented reality glasses with the aid of the environmental data.

According to another disclosed embodiment, a transportation vehicle comprises a number of windows, the windows being adapted to block light of a particular polarization. To this end, the windows may comprise a polarization-filtering layer.

According to the disclosed embodiments, during the inside-out tracking of augmented reality glasses, separation is carried out of objects which are intended to be followed and objects which are not intended to be followed, by using polarized light. To this end, the transportation vehicle windows have polarization-filtering properties, for example, by a polarization-filtering layer applied onto the windows. Only polarized light therefore enters the interior from the exterior. The acquisition device of the augmented reality glasses is adapted to detect only light with a polarization which is complementary to the polarization of the light that enters the interior from the exterior. To this end, the optical acquisition device may comprise a polarization filter. In this way, it is no longer possible for the acquisition device to acquire parts of the exterior beyond the boundaries of the transportation vehicle. For the pose determination of the augmented reality glasses, only the acquired interior of the transportation vehicle is therefore used. At the same time, the driver can see through the polarizing windows without substantial restrictions.

According to at least one disclosed embodiment, the optical acquisition device is adapted to acquire only horizontally, vertically or circularly polarized light. For these polarizations, suitable filters are available at acceptable prices, so that the required polarization filtering can be carried out economically.

According to at least one disclosed embodiment, the optical acquisition device comprises at least one camera for acquiring image data of the environment of the augmented reality glasses. To determine the pose of the augmented reality glasses, edges or significant points the image data may then be detected and evaluated. This makes it possible to combine the polarization-based separation of the exterior and the interior of transportation vehicle with modern algorithms for pose determination, which use machine learning.

According to at least one disclosed embodiment, the augmented reality glasses comprise a light source for illuminating the environment. In this way, the pose determination can still be carried out reliably even if scarcely any or only little natural light is present.

A disclosed method or disclosed augmented reality glasses are used in a transportation vehicle.

Disclosed embodiments are explained in more detail below with the aid of the figures. It is to be understood that the disclosure is not limited to these disclosed embodiments, and that the features described may also be combined or modified without departing from the protective scope of the disclosure.

FIG. 1 schematically shows the concept of the disclosed solution for determining a pose of augmented reality glasses. Inside-out tracking of augmented reality glasses will be assumed. In this case, separation is carried out of objects which are intended to be followed and objects which are not intended to be followed, by using polarized light. To this end, the transportation vehicle windows have polarization-filtering properties, for example, by a polarization-filtering layer applied onto the windows. Polarization filters transmit light waves only in a particular polarization. Only polarized light therefore enters the interior from the exterior. When this light is then fed through a further complementary filter, this light cannot penetrate further. The acquisition device of the augmented reality glasses is therefore adapted to detect only light with a polarization which is complementary to the polarization of the light that enters the interior from the exterior. To this end, the optical acquisition device may comprise a polarization filter. These filters may be applied as a film of the transportation vehicle windows and the optical acquisition device. Between the two filters, the light can be perceived without great restrictions. This makes it possible for the driver to be able to register the outside world and at the same time for a visual positioning system of the augmented reality glasses only to be able to register the interior, i.e., it is no longer possible for the optical acquisition device to acquire parts of the exterior beyond the boundaries of the transportation vehicle. For the pose determination of the augmented reality glasses, only the acquired interior of the transportation vehicle is therefore used.

Figure 2:
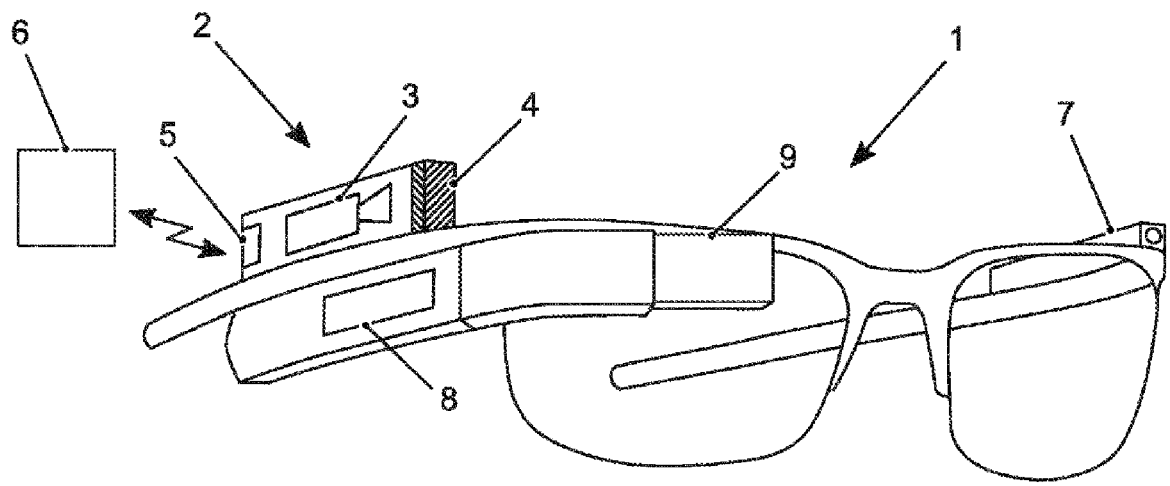
FIG. 2 schematically shows augmented reality glasses.

FIG. 2 schematically shows augmented reality glasses 1. The augmented reality glasses 1 has an optical acquisition device 2, which comprises, for example, a camera 3, for acquiring environmental data of an environment of the augmented reality glasses 1. In this case, the optical acquisition device 2 is adapted only to acquire light of a defined polarization, for example, only horizontally, vertically or circularly polarized light. To this end, the optical acquisition device 2 comprises a polarization filter 4. By an interface 5, there is a connection to an external pose determination device 6 for determining a pose of the augmented reality glasses 1 with the aid of the environmental data. The pose determination device 6 may to this end, for example, detect and evaluate edges or significant points in the image data. The pose determination device 6 may naturally also be a part of the augmented reality glasses 1. By a graphics unit 8, the display of the augmented reality glasses 1 may be adapted according to the pose which has been determined. To this end, the pose determination device 6 and the graphics unit 8 may exchange data with one another. The graphics unit 8 may, as represented in the example, be a part of the augmented reality glasses 1 or connected to the augmented reality glasses 1 by an interface. Optionally, the augmented reality glasses 1 comprise a light source 7 for illuminating the environment, so as to be able to carry out a pose determination even under poor light conditions. The display generated by the graphics unit 8 is overlaid by a projection unit 9.

Figure 3:
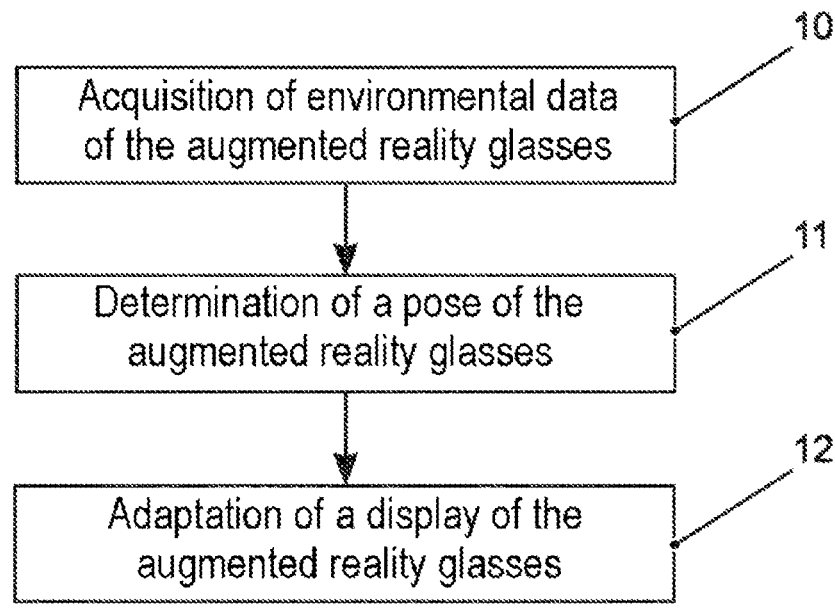
FIG. 3 schematically shows a method for determining a pose of augmented reality glasses.

FIG. 3 schematically shows a method for determining a pose of augmented reality glasses. In a first operation, environmental data of an environment of the augmented reality glasses 10 are recorded and, only light of a particular polarization being acquired by the optical acquisition device. The optical acquisition device may, for example, be a camera which records the image data of the environment. With the aid of the environmental data, a pose of the augmented reality glasses is then determined 11. To this end, for example, edges or significant points in the image data may be detected and evaluated. The display of the augmented reality glasses is finally adapted 12 according to the pose which has been determined, so that, for example, visible objects may be overlaid visually correctly with represented objects.

Figure 4:
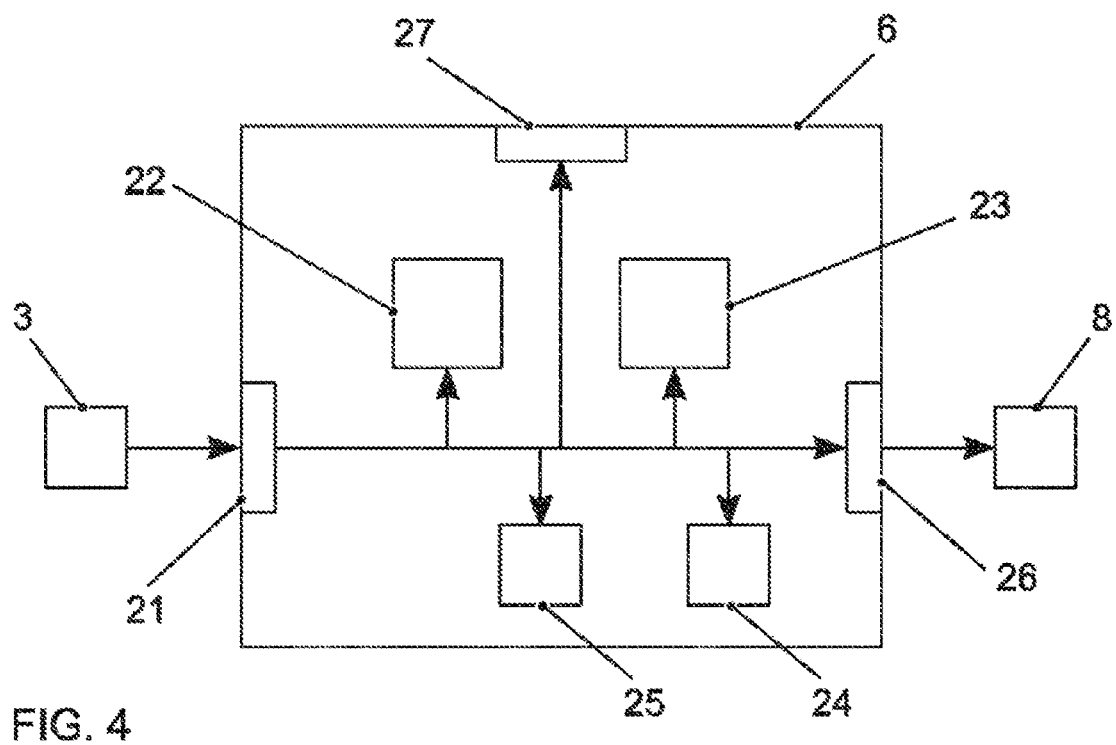
FIG. 4 shows a first embodiment of a pose determination device.

FIG. 4 shows a simplified schematic representation of a first disclosed embodiment of a pose determination device 6. The pose determination device 6 has an input 21, through which image data of the camera 3 of the augmented reality glasses can be received. The device 20 furthermore has an image processing unit 22 for detecting edges or significant points in the image data. An analysis unit 23 determines the pose of augmented reality glasses from the edges or significant points. Through an output 26 of the pose determination device 6, information about the pose which has been determined is output to a graphics unit 8. The graphics unit 8 may then adapt the display of the augmented reality glasses according to the pose which has been determined. The display of the augmented reality glasses is in this case adapted in such a way that visible objects are overlaid visually correctly with represented objects. The graphics unit 8 may be a part of the augmented reality glasses or connected to the augmented reality glasses by an interface.

The image processing unit 22 and the analysis unit 23 may be controlled by a control unit 24. By a user interface 27, settings of the image processing device 22, of the analysis unit 23 or of the control unit 24 may optionally be changed. The data obtained in the device 20 may if required be stored in a memory 25 of the device 20, for example, for later evaluation or for use by the components of the device 20. The image processing unit 22, the analysis unit 23 and the control unit 24 may be produced as dedicated hardware, for example, as integrated circuits. Naturally, however, they may also be partially or fully combined or implemented as software which runs on a suitable processor, for example, on a GPU. The input 21 and the output 26 may be implemented as separate interfaces or as a combined bidirectional interface. The pose determination device 6 may be a part of the augmented reality glasses or connected to the augmented reality glasses by an interface.

Figure 5:
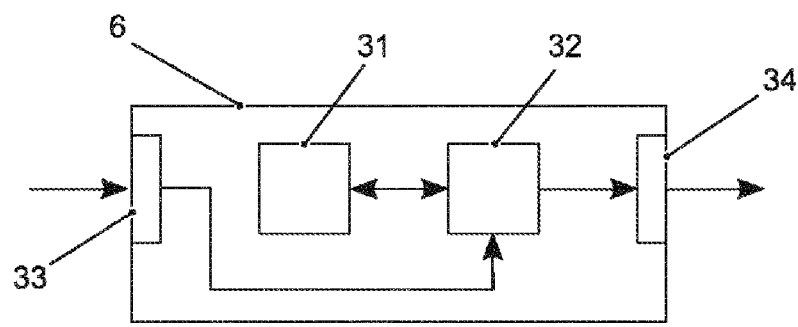
FIG. 5 shows a second embodiment of a pose determination device.

FIG. 5 shows a simplified schematic representation of a second disclosed embodiment of a pose determination device 6. The pose determination device 6 comprises a processor 32 and a memory 31. For example, the device 30 is a computer or a controller. The pose determination device 6 has an input 33 for receiving information, for example, image data of the camera of the augmented reality glasses. Stored in the memory 31 there are instructions which, when run by the processor 32, cause the pose determination device 6 to detect edges or significant points in the image data and to determine the pose of the augmented reality glasses from the edges or significant points. The instructions stored in the memory 31 therefore embody a program, executable by the processor 32, which carries out the disclosed method. Data generated by the processor 32 are provided through an output 34. They may furthermore be stored in the memory 31. The input 33 and the output 34 may be combined to form a bidirectional interface.

The processor 32 may comprise one or more processing units, for example, microprocessors, digital signal processors or combinations thereof.

The memories 25, 31 of embodiments described may have both volatile and nonvolatile memory areas, and may comprise a very wide variety of storage devices and storage media, for example, hard disks, optical storage media or semiconductor memories.

Figure 6:
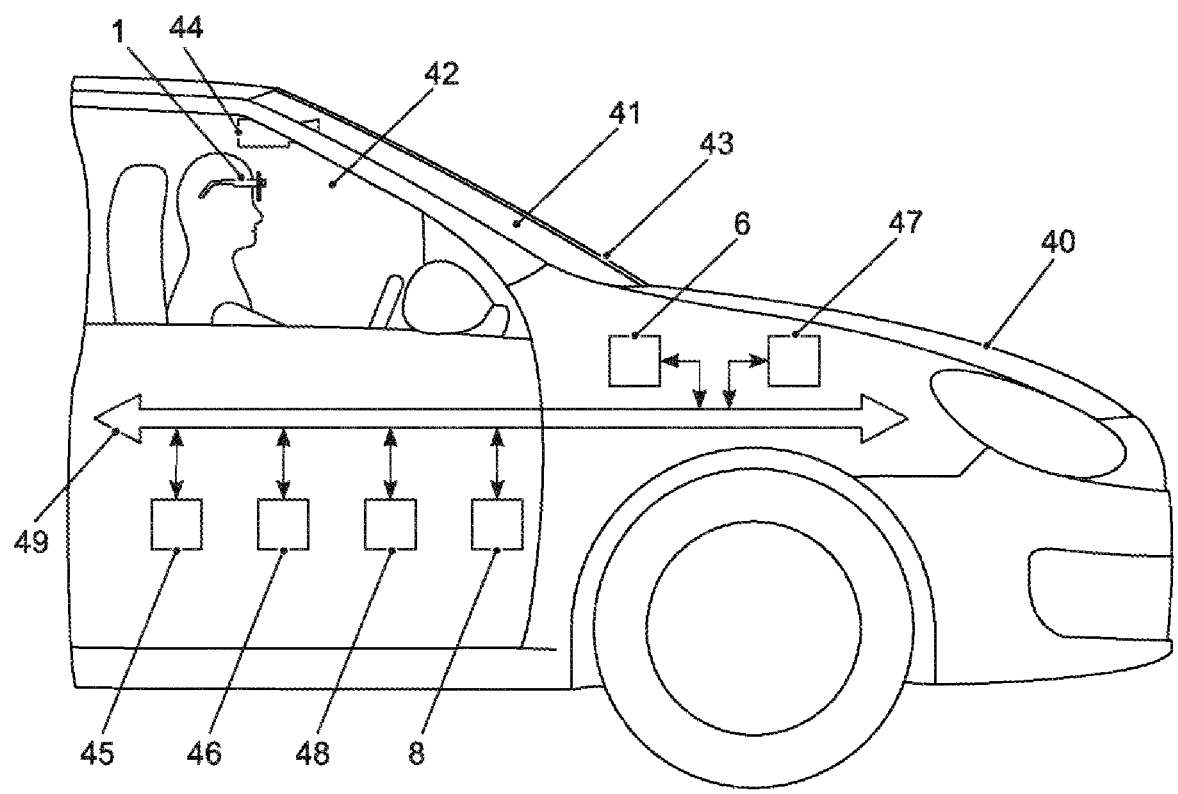
FIG. 6 schematically shows a transportation vehicle in which a disclosed solution is implemented.

FIG. 6 schematically shows a transportation vehicle 40 in which a disclosed solution is implemented. In this example, the pose determination device 6 is implemented in the transportation vehicle 40 and is not part of the augmented reality glasses 1. By an interface (not represented), augmented reality glasses 1 may be connected wirelessly or in a cabled state to the pose determination device 6. The front window 41 and the side windows 42, as well as other windows, are provided with a polarization-filtering layer 43 so that, in combination with the polarization-selective optical acquisition device of the augmented reality glasses 1, only the transportation vehicle interior is acquired for the pose determination. For the sake of simplicity, only the polarization-filtering layer 43 on the front window 41 is represented in the figure. The transportation vehicle 40 furthermore comprises a camera 44, a navigation system 45, a data transmission unit 46 and a range of assistance systems 47, one of which is represented by way of example. By the data transmission unit 46, a correction may be set up to service providers. To store data, there is a memory 48. The data exchange between the various components of the transportation vehicle 40 takes place via a network 49. From the data of the various transportation vehicle systems, a display for the augmented reality glasses 1 is calculated by a graphics unit 8. In FIG. 6, the graphics unit is implemented in the transportation vehicle 40, although it may also be part of the augmented reality glasses 1.

Figure 7:
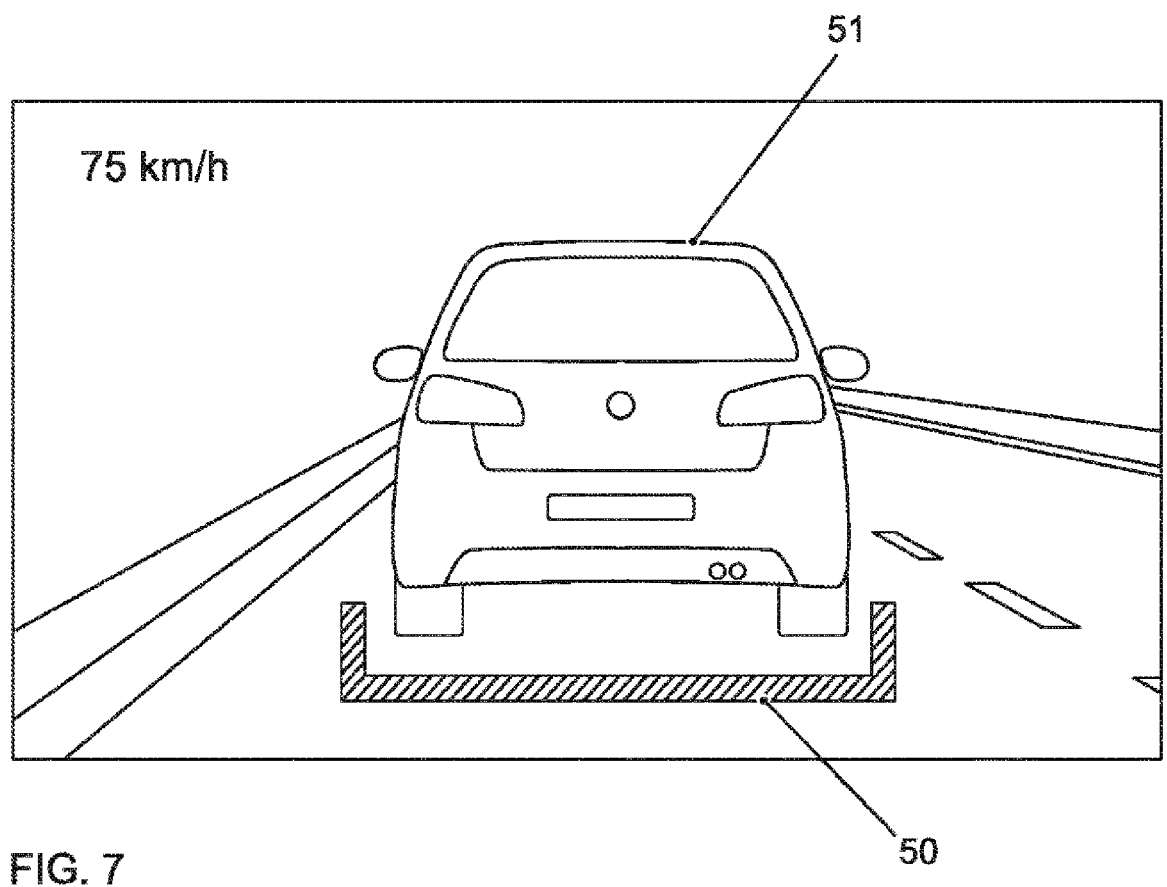
FIG. 7 shows an example of an augmented reality representation of augmented reality glasses.

FIG. 7 shows an example of an augmented reality representation of augmented reality glasses. A range of elements are superimposed on the actual environment, some in contact-analog representation. In the example in FIG. 7, these are a current speed and a marking 50, which marks a transportation vehicle 51 driving in front for the visualization of an ACC system status (ACC: Adaptive Cruise Control). Besides this, navigation information, warning indications or other elements may be displayed. For the specific configuration of the representation, many configuration possibilities are available to the person skilled in the art.

LIST OF REFERENCES 1 augmented reality glasses
2 optical acquisition device
3 camera
4 polarization filter
5 interface
6 pose determination device
7 light source
8 graphics unit
9 projection unit
10 acquisition of environmental data of the augmented reality glasses
11 determination of a pose of the augmented reality glasses
12 adaptation of a display of the augmented reality glasses
21 input
22 image processing unit
32 analysis unit
24 control unit
25 memory
26 output
27 user interface
31 memory
32 processor
33 input
34 output
40 transportation vehicle
41 front window
42 side windows
43 polarization-filtering layer
44 camera
45 navigation system
46 data transmission unit
47 assistance system
48 memory
49 network
50 marking
51 transportation vehicle driving in front

REFERENCES

[1] Guy Berg: "Das Vehicle in the Loop—Ein Werkzeug für die Entwicklung and Evaluation von sicherheitskritischen Fahrerassistenzsystemen" [The vehicle in the loop—a tool for the development and evaluation of safety-critical driver assistance systems] Dissertation at the Faculty of Aeronautical and Astronautical Engineering of the Bundeswehr University Munich (2014), athene-forschung.unibw.de/node?id=97267

The invention claimed is:

1. Augmented reality glasses for a transportation vehicle including a plurality of windows, the augmented reality glasses comprising:
   an optical acquisition device for acquiring environmental data of an environment of the augmented reality glasses; and
   an interface to a pose determination device for determining a pose of the augmented reality glasses with the aid of the environmental data,
   wherein the optical acquisition device acquires only light of a defined polarization, and acquires only light with a polarization which is complementary to the polarization of the light that enters the interior of the transportation vehicle from an exterior of the transportation vehicle, and
   wherein the augmented reality glasses enable the driver to see through the plurality of windows without substantial restrictions.

2. The augmented reality glasses of claim 1, wherein the optical acquisition device comprises a polarization filter.

3. The augmented reality glasses of claim 1, wherein the optical acquisition device acquires only horizontally, vertically or circularly polarized light.

4. The augmented reality glasses of claim 1, wherein the optical acquisition device comprises at least one camera for acquiring image data of the environment of the augmented reality glasses.

5. The augmented reality glasses of claim 1, wherein the pose determination device detects and evaluates edges or significant points in the image data to determine the pose of the augmented reality glasses.

6. The augmented reality glasses of claim 1, further comprising a light source for illuminating the environment.

7. A method for determining a pose of augmented reality glasses, the method comprising:
   acquiring environmental data of an environment of the augmented reality glasses with an optical acquisition device; and
   determining a pose of the augmented reality glasses with the aid of the environmental data,
   wherein only light of a particular polarization is acquired by the optical acquisition device during the acquisition of the environmental data, and only light with a polarization which is complementary to the polarization of the light that enters the interior of the transportation vehicle from an exterior of the transportation vehicle is acquired by the optical acquisition device during the acquisition of the environmental data, and
   wherein the augmented reality glasses enable the driver to see through the plurality of windows without substantial restrictions.

8. The method of claim 7, wherein the optical acquisition device acquires image data of the environment of the augmented reality glasses by at least one camera.

9. The method of claim 8, wherein edges and significant points in the image data are detected and evaluated for the determination of the pose of the augmented reality glasses.

10. A system comprising:
    augmented reality glasses that include an optical acquisition device for acquiring environmental data of an environment of the augmented reality glasses; and
    an interface to a pose determination device for determining a pose of the augmented reality glasses with the aid of the environmental data,
    wherein the optical acquisition device acquires only light of a defined polarization, and acquires only light with a polarization which is complementary to the polarization of the light that enters the interior of the transportation vehicle from an exterior of the transportation vehicle, and wherein the augmented reality glasses enable the driver to see through the plurality of windows without substantial restrictions.

11. A transportation vehicle comprising the system of claim 10, the transportation vehicle further comprising:
a plurality of windows,
wherein the plurality of windows block light of a particular polarization.

12. The system of claim 11, wherein the plurality of windows comprise a polarization-filtering layer.

13. The system of claim 10, wherein the optical acquisition device comprises a polarization filter.

14. The system of claim 10, wherein the optical acquisition device acquires only horizontally, vertically or circularly polarized light.

15. The system of claim 10, wherein the optical acquisition device comprises at least one camera for acquiring image data of the environment of the augmented reality glasses.

16. The system of claim 10, wherein the pose determination device detects and evaluates edges or significant points in the image data to determine the pose of the augmented reality glasses.

17. The system of claim 10, further comprising a light source for illuminating the environment.

* * * * *